US006664667B2

(12) United States Patent
Mayer et al.

(10) Patent No.: US 6,664,667 B2
(45) Date of Patent: Dec. 16, 2003

(54) TRANSPORT SYSTEM

(75) Inventors: Otto Mayer, Lauchheim (DE); Klaus Wohlfarth, Satteldorf (DE)

(73) Assignee: Cooper Power Tools GmbH & Co., Westhausen (DE)

( * ) Notice: Subject to any disclaimer, the term of this patent is extended or adjusted under 35 U.S.C. 154(b) by 90 days.

(21) Appl. No.: 10/008,221

(22) Filed: Nov. 6, 2001

(65) Prior Publication Data

US 2002/0084701 A1 Jul. 4, 2002

Related U.S. Application Data

(63) Continuation of application No. PCT/EP00/04065, filed on May 5, 2000.

(30) Foreign Application Priority Data

May 6, 1999 (DE) .................................. 299 08 093 U

(51) Int. Cl.[7] .............................................. H02K 41/00
(52) U.S. Cl. ............................. 310/12; 310/12; 310/13; 310/14; 310/15
(58) Field of Search ............................ 310/12, 13, 15

(56) References Cited

U.S. PATENT DOCUMENTS 4,793,263 A * 12/1988 Basic ........................ 104/282
4,958,115 A * 9/1990 Miller ........................ 318/362
5,690,209 A   11/1997 Kofoed
5,741,985 A   4/1998 Gaete
5,763,965 A * 6/1998 Bader ........................ 310/12
5,894,919 A   4/1999 Tacchi et al.
5,927,464 A   7/1999 Clark et al.
6,005,310 A * 12/1999 Mosciatti et al. ............. 310/12
6,455,957 B1 * 9/2002 Chitayat ...................... 310/12

FOREIGN PATENT DOCUMENTS

DE           3508841 A         3/1985
JP           60-161818         8/1985

* cited by examiner

*Primary Examiner*—Nestor Ramirez
*Assistant Examiner*—Iraj A. Mohandesi
(74) *Attorney, Agent, or Firm*—Coats & Bennett, P.L.L.C.

(57) ABSTRACT

A transport system includes at least one product carrier which is adapted to be moved along a slide way by means of a linear motor drive unit comprising a primary part and a secondary part. In order to improve the transport system in such a way that basically any number of product carriers can be moved along the slide way independently of one another and can be used in a versatile manner for transporting different types of products or workpieces, the product carrier is provided with a substantially flat base plate for transporting objects, the base plate having associated therewith the primary part, and the slide way having associated therewith the secondary part.

22 Claims, 1 Drawing Sheet

TRANSPORT SYSTEM

This application claims priority from German Patent Application No. 229 08 093.5, which was filed on May 6, 1999 and is a continuation of PCT Application No. PCT/EP00/04065, which was filed on May 5, 2000.

BACKGROUND OF THE INVENTION

The present invention relates to a transport system including at least one product carrier which is adapted to be moved along a slide way by means of a linear motor drive unit comprising a primary part and a secondary part.

Such a transport system is known from DE 4413625A1. In the case of this known transport system a carriage means, used as a product carrier, is moved along a first slide way by means of a linear motor drive unit and is displaceable together with said first slide way along a second slide way. The first slide way has arranged thereon a stator or primary part of the linear motor drive unit. A complementary rotor or secondary part is secured to the carriage means. The carriage means supports a vertically displaceable support column, a product or workpiece carrier in the form of a gripper being arranged at the at the lower end of said support column.

The known transport system serves to take hold of and lay down a specific product or workpiece by means of the gripper. The carriage means is movable to a limited extent along the first slide way between two fixed points, and the carriage means, together with said first slide way, is movable as a whole along the second slide way between two further points so that the articles held by the gripper can, on the whole, be moved along each of the three coordinate axes along three-dimensional path curves.

The known transport system is disadvantageous insofar as only special articles, goods, workpieces or products can be transported due to the gripper and insofar as only one product carrier can be moved by external influence via the primary part of the linear motor drive unit.

It is therefore the object of the subject matter of the application to improve the transport system described at the start in such a way that basically any number of product carriers can be moved along the slide way independently of one another and can be used in a versatile manner for transporting a great variety of products or workpieces.

In connection with the features of the generic clause of claim 1, this object is achieved in that the product carrier is provided with a substantially flat base plate for transporting objects, the base plate having associated therewith the primary part and the slide way having associated therewith the secondary part.

A transport system having a similar structural design is described in DE 298 16 285 of the same applicant; in this transport system, the secondary part is arranged on the product carrier and the primary part is arranged on the slide way.

In comparison with the last-mentioned prior art and, similarly, also in comparison with the first-mentioned prior art, the present invention is so conceived that the linear motor is used in the reverse mode so that each product carrier can be controlled individually and independently of other product carriers. Each product carrier can therefore be accelerated or delayed separately so that buffering of the individual product carriers can be dispensed with e.g. along path lengths where a congestion of product carriers may occur. An individual and conflict-free control of the various product carriers is obtained, and it will not be necessary to provide stoppers and/or shock absorbers on the product carriers. In addition, a smaller number of product carriers is required, since only as many product carriers are required as there are work orders to be executed along the slide way and the work stations located at said slide way. In comparison with the transport system according to DE 298 16 285, it can be assumed that the number of product carriers required for a production process can be reduced by 50%.

Due to the separate control of the individual product carriers, said product carriers can be accelerated and delayed more effectively, whereby the feed/discharge cycle times will be reduced and production downtimes can be made up for by variable speeds of the product carriers.

In view of the individual control of each product carrier, said product carriers are protected against running into the back of other product carriers, i.e. they are protected against colliding with other product carriers, so that squeezing and shearing points on the product carrier will be avoided. Such squeezing and shearing points may otherwise occur when two successive product carriers collide or when a product carrier gets stuck in its slide way and when e.g. a subsequent product carrier runs into the back of said stuck product carrier.

U.S. Pat. No. 4,849,664 discloses a further linear-motor vehicle system in the case of which respective vehicles are adapted to be moved along horizontal as well as vertical transport paths by means of a linear-motor drive unit. With respect to various embodiments disclosed in this publication, it can be stated, with regard to all these embodiments, that the'stator of the linear drive unit is associated with the respective slide way and that the rotor is associated with the respective vehicle or product carrier. The vehicle is then moved by controlling the primary parts, which are arranged along the slide way, in a suitable manner.

According to a simple embodiment of the transport system according to the present invention, the primary part can be arranged on the base plate, especially on the lower surface of said base plate. This means that such a primary part can be arranged in a simple manner and that it will easily be accessible when maintenance work or the like has to be carried out. In addition, the secondary part can be arranged in directly opposed relationship with the primary part on the slide way, only a small gap remaining between these two parts.

In cases in which the base plate of the product carrier is sufficiently high, the primary part can additionally be arranged in the base plate such that it is at least partially embedded therein. If the base plate is sufficiently high, the primary part can also be embedded completely therein and terminate such that its lower surface is flush with the lower surface of the base plate. The product carrier can in this way be arranged very close to the slide ways, when e.g. also the secondary part is arranged in an embedded mode of arrangement, so that the total construction height of the transport system can be reduced. In addition, the primary and the secondary part are largely protected against damage in this way.

The linear motor drive unit can be implemented as an asynchronous motor or a synchronous motor. The motor used is preferably an asynchronous motor.

Since the primary part is associated with the product carrier or base plate, a suitable voltage or power supply must be provided. According to one embodiment, the voltage supply unit is implemented as a rechargeable battery, accumulator or the like. This voltage supply unit is arranged in or on the product carrier and especially in or on the base plate of the product carrier. In the case of such a rechargeable voltage supply unit, recharging can be effected e.g. at a separate charging station along the transport system or at a work station or the like which can be accessed by the product carrier. The charging process can be controlled automatically or by hand.

The slide way of the transport system according to the present invention can be realized in different ways. DE 298 16 285, which is owned by the same applicant, describes e.g. horizontally and vertically arranged slide ways with suitable guide means for the product carriers. The base plates are oriented horizontally or vertically in a corresponding manner. Such horizontal and vertical arrangements with suitable holders and guide means according to DE 298 16 285 can also be used in the transport system according to the present invention.

In the described embodiment of the transport system according to the present invention, the slide ways are formed by a pair of slide rails held in spaced relationship with one another by a plurality of support sections set up substantially vertically on a foundation. Instead of the support sections, it is also possible to use, in a similar way, support posts having a structural design which is similar to that described in DE 298 16 285.

In order to bridge the free space between the support sections, a cover section can be arranged between the support sections. This cover section can extend along the slide ways in the whole transport system.

Since the cover section faces substantially the lower surface of the base plate or product carrier, the secondary part or the secondary parts can be arranged on the cover section along the slide way. In the case of synchronous motors, magnets and especially profile magnets are used as secondary parts, which, analogously to the primary part, can be arranged on the cover section or which can be embedded at least partially in said cover section, whereas the secondary parts used in the case of asynchronous motors are preferably copper rails with steel backs.

The base plate can be guided along the slide way along its longitudinal edges and/or on its lower surface adjacent said longitudinal edges so as to be able to move the product carrier reliably along the slide way.

This mode of guiding the base plate can be realized in different ways. Roller elements, spherical elements, guide elements, friction-reducing guide means or the like can, for example, be arranged between the base plate and the slide way. These elements or means can be arranged in spaced relationship with one another or also in a continuous mode in the case of rail-shaped guide elements or guide means. The respective elements or means can be provided on the slide way or slide rails and/or on the base plate.

Since the product carriers of the transport system according to the present invention can be controlled individually, it will be advantageous to monitor their position. Such position monitoring can be realized by arranging a position determination unit between the product carrier and the slide way. This position determination unit may be defined e.g. by a scale and a scale reading system. The scale can be arranged on the product carrier or on the cover section or on the slide ways and, accordingly, the scale reading system can be arranged on the respective other part. Preferably, the scale reading system is arranged on the moving product carrier so that the respective product-carrier position can be determined by the product carrier itself.

Due to the exact position determination for each product carrier, an indexing means at each work station along the slide way can, for example, be dispensed with as well, since each product carrier can be positioned precisely relative to the scale. In this connection, it can additionally be considered to be advantageous when the product carrier is provided with onboard electronics supplied especially by the voltage supply unit and communicating with a central station so as to exchange data and/or instructions. In this way, information is exchanged between the product carrier and the central station. This information can be transmitted e.g. for determining the position of the individual product carriers, for accelerating or delaying said product carriers, for identifying them, for electrically encoding a work order or the like. The information can be transmitted by means of a bus system between the product carrier and e.g. the cover section. It will be advantageous to implement such a bus system in optical waveguide technology. The information can also be transmitted by radio transmission or in some other way.

The product carrier can be provided with display and/or interrogation and/or input means so that information can also be gathered from the work stations and from the product carriers directly at said work stations or while said product carriers are moving. In this way, information can be displayed directly at the product carrier e.g. via the display means. It is also possible to input via an input means a free-to-move information for the product carrier, which can be transmitted to the central station. The product carrier can be moved on immediately after the free-to-move information, whereby absolutely free line clocking for the whole transport system will be obtained.

The display means can also be used for transmitting information to the workers at the various work stations or additional information can be called from the central station via a respective interrogation means and via the product carrier.

Especially in a transport system in which the base plate has to be associated with a work station for a prolonged period of time, it will be advantageous when substantially the base plate alone is left behind at this work station, whereas the product-carrier drive means associated with said base plate is used e.g. for other base plates. This can be realized by arranging the primary part on a vehicle which is adapted to be coupled to the base plate. This vehicle is coupled to or decoupled from the base plate according to requirements. One vehicle can be used for moving a plurality of base plates so that the total cost of the transport system according to the present invention will be reduced. In this connection, it will also prove to be advantageous when an identification can be associated with each product carrier or rather the base plate thereof, so that the base plate can be transported to the location of use, or transported away after it has been used, by means of an arbitrary vehicle. It is also possible to operate specific sections of the transport system with only one vehicle which moves all the base plates that are movable along this transport section.

In order to be able to identify not only the position of the base plate, it is in this connection considered to be advantageous when a respective position determination unit is associated with the base plate and with the vehicle.

In order to be able to move the vehicle independently of the base plate and, if necessary, said base plate also independently of the respective vehicle, the vehicle can be movable along a separate vehicle slide way extending especially below the base plate.

In the most simple case, this vehicle slide way can be formed on the cover section.

The voltage supply unit or a further voltage supply unit can be arranged in or on the vehicle, since the vehicle should be movable along the vehicle slide way also without having the base plate coupled thereto.

According to one embodiment of the transport system according to the present invention, the vehicle slide way can consist of a substantially U-shaped slide-way groove which is open at the top in the direction of the base plate and which is implemented in the cover section. In this groove the vehicle moves unhindered and independently of the base plates.

A simple coupling possibility between the vehicle and the base plate can be realized e.g. by arranging a releasable coupling means between the vehicle and the base plate. This coupling means may e.g. be provided with a lifting magnet which, when the base plate is being coupled to the vehicle, can be displaced from the vehicle upwards into a suitable opening provided in the lower surface of the base plate. For the purpose of decoupling, the lifting magnet is drawn back.

Further coupling means are known in practice and can also be used in the transport system according to the present invention in a corresponding manner. It is also possible to decouple e.g. the vehicle and the base plate by hand, when the base plate has reached a desired position. The arrangement of the product carrier at the desired position can take place e.g. via the input means for fine-positioning and decoupling from the vehicle can subsequently also take place with the aid of this means. It is also possible to decouple the base plate from the vehicle automatically or by a mechanical stop or the like, when a desired target position has been reached.

The slide-way groove can be covered by a cover so as to prevent, as far as possible, workers from putting their hands into the travelling path of the vehicle along the transport system, whereby the risk of injuries will be reduced, said cover having formed therein a slot which extends in the direction of movement of the vehicle and which permits the coupling means to extend therethrough. This comparatively narrow slot will also prevent parts from falling onto the vehicle slide way, which parts would obstruct an advance movement of the vehicle or even cause damage to said vehicle.

An adjustable rotary plate can rotatably be supported on the base plate so that products placed on the product carrier in the transport system according to the present invention can be oriented in accordance with their intended use. The rotary plate may cover only part of the base plate, but it may also have the same dimensions as or even larger dimensions than the base plate.

A linear rotary drive unit can be implemented between said rotary plate and the base plate so as to be able to easily rotate the rotary plate relative to the base plate. Like the drive means for the vehicle and the product carrier, also this linear rotary drive unit can be supplied via the above-described voltage supply unit.

In order to prevent especially the base plates which have been decoupled from the vehicle from continuing their movement, a brake means can be arranged on the slide ways, on the cover means or on the base plates. This brake means especially serves to stop and retain in position the base plate in the in the area of work stations along the slide way. Also the brake means can be operated manually or automatically.

Since the vehicle is movable in both directions along the slide way, it may prove to be advantageous, especially when a plurality of vehicles move along one transport section, when the vehicle slide way includes at least one return section for returning vehicles, which have been decoupled from the base plate, to a return location. This will permit one vehicle to be moved past another vehicle without hindrance.

Due to the separate control of the various product carriers, the transport system according to the present invention offers the possibility of accelerating and decelerating the product carriers more effectively, whereby the cycle time per work station will be reduced. The product carriers are also able to carry out a reverse movement so that it will e.g. be possible to repeat a work order which has not been carried out in a satisfactory manner. Furthermore, various, partially parallel production and transport paths can be implemented along a production line. An almost arbitrary routing without corner rotating stations for changing the direction of movement of the product carriers is possible. Finally, it should also be pointed out that the transport system according to the present invention permits a simple adaptation of heights so that the product carriers can also ascend and descend during the production process.

In accordance with a further embodiment of the transport system according to the present invention, the workpiece or product carrier can have arranged thereon a rotary or displacement plate which is movable relative to the carrier. This plate can be used for changing the position of a workpiece relative to the carrier, especially also during transport of said workpiece. The rotary/displacement plate can additionally be equipped with a gripping or clamping mechanism for holding the workpiece or the product, or a reception means for holding the workpiece can be arranged on the plate.

With respect to DE 298 16 285 of the same applicant, it should be pointed out that the above-described vehicle including a coupling means for a base plate may also be implemented in the way described in said DE 298 16 285, i.e. such that the secondary part is arranged on the vehicle and the primary part on the slide way or the like. The above-described advantages for the primary part on the moved object of the transport system are, however, not achieved in this case.

BRIEF DESCRIPTION OF THE DRAWINGS

In the following, advantageous embodiments of the present invention will be explained in detail making reference to the figures added in the drawing, in which.

DETAIL DESCRIPTION

Figure 3:
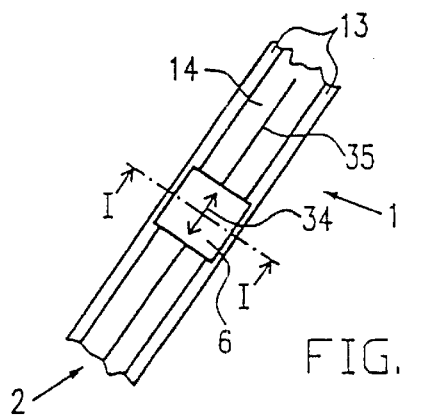
FIG. 3 shows a top view of a transport section of a schematically shown transport system according to the present invention.

In FIG. 3 it can be seen that the transport system 1 includes a slide way 2 extending e.g. along a production line so as to transport workpieces, products or other objects by means of a product carrier 6. The product carrier 6 has a substantially flat surface onto which the respective object can be placed and then transported in directions 34 along the slide way 2. The product carrier 6 is guided along the longitudinal sides thereof by slide rails 13 which define the slide way 2 and between which a cover section 14 extends.

Figure 1:
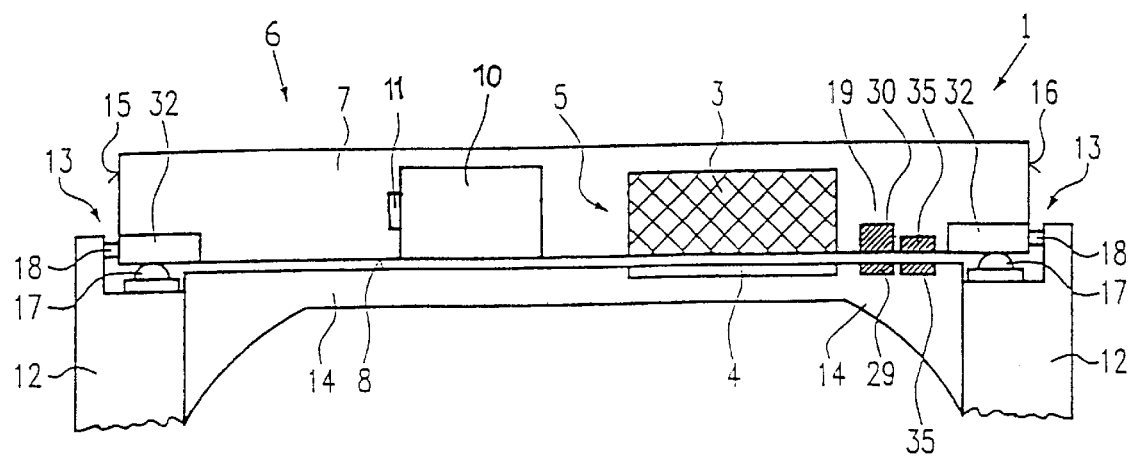
FIG. 1 shows a section along line I—I through a transport system according to the present invention as shown in FIG. 3.

FIG. 1 shows a section along line I—I of FIG. 3. In this figure and also in the following figure identical components are designated by identical reference numerals, only part of the respective components being mentioned.

The product carrier 6 is essentially defined by a base plate 7 having horizontal upper and lower surfaces. A product, workpiece or other object can be placed on the upper surface of the base plate 7.

Along lateral edges 15, 16 of the base plate 7 and in areas of the lower surface 8 which are located adjacent the lateral edges, the base plate 7 is guided by roller and guide elements 17, 18 along the slide rails 13. The slide rails have a substantially L-shaped cross-section, each leg of the L having associated therewith a roller and guide element 17, 18. In the area of the lateral edges 15, 16 and lower surface 8, the base plate 7 is provided with slide strips 32 on which the respective elements 17, 18 abut.

The base plate 7 has arranged therein a primary part 3 which constitutes part of a linear motor drive unit 5. A secondary part 4 of the linear motor drive unit 5 is arranged in opposed relationship with said primary part 3, said secondary part 4 being arranged in a cover section 14 extending between substantially vertical support sections 12. The secondary part 4 is defined e.g. by profile magnets in the case of synchronous motors and by copper rails with steel plates in the case of asynchronous motors along the slide way 2, cf. FIG. 3.

A rechargeable battery 10 or accumulator is provided as a voltage supply unit 9 for supplying power to the primary part 3. In the embodiment shown, such an accumulator is arranged such that it is embedded in the base plate 7. For charging the accumulator, suitable terminals 11, e.g. plug contacts or the like, are provided.

For determining the position of the product carrier 6, a position determination unit 19 is provided, which comprises a scale means 29 and a scale reading means 30. The scale means 29 is arranged on an upper surface of the cover section 14, which is opposed to the lower surface 8 of the base plate 7, and extends parallel to the slide rails 13. The lower surface 8 of the base plate 7 has arranged thereon the scale reading means 30 which is located in opposed relationship with the scale means 29. A bus system consisting of bus lines 35 is arranged in side-by-side relationship with the position determination unit 19, said bus lines being implemented e.g. in optical waveguide technology.

Figure 2:
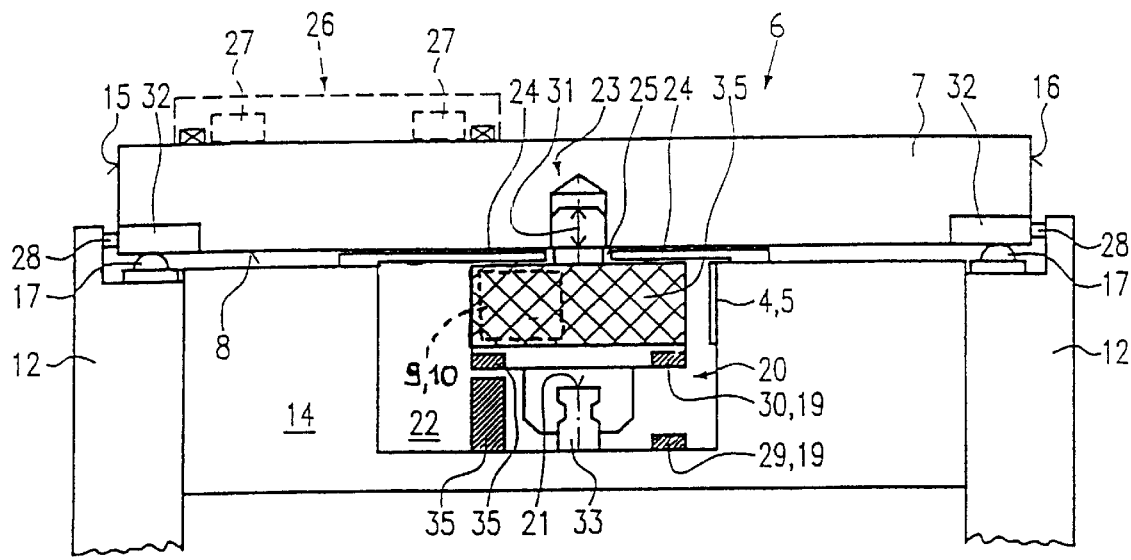
FIG. 2 shows a section through a second embodiment corresponding to the section of FIG. 1.

FIG. 2 shows a section, analogous to FIG. 1, through a second embodiment. This second embodiment differs from the first one insofar as a vehicle 20, which is adapted to be coupled to the base plate 7, is provided. Furthermore, a rotary plate 26 is shown in the form of broken lines on the upper surface of the base plate 7 in FIG. 2, said rotary plate 26 being supported on the base plate 7 such that it is adapted to be rotated relative thereto. The rotary plate 26 is provided with a linear rotary drive unit 27 as a rotary drive.

The cover section 14 has arranged therein a U-shaped slide-way groove 22 for accommodating the vehicle 20. The vehicle 20 is accommodated almost completely in this slide-way groove 22. On a lower surface of the vehicle, which is opposed to the base plate 7, said vehicle 20 is movable along a rail 33 comprising a vehicle slide way 21. The primary part 3 is integrated in the vehicle 20 as part of the linear motor drive unit 5. The complementary secondary part 4 is located within the slide-way groove 22 in closely spaced relationship with the primary part 3. Analogously to FIG. 1, the respective voltage supply unit 9 in the form of an accumulator 10 can be arranged in or on the vehicle 20. The respective terminals 11 for recharging the accumulator have been omitted so as to simplify matters.

For determining the position of the vehicle, a respective position determination unit 19 is provided between the vehicle 20 and the slide-way groove 22. Like the position determination unit 19 which has already been described in FIG. 1, this position determination unit 19 can be composed of a scale means 29 and a scale reading means 30. A bus system 35 can be provided as well.

The respective position determination unit 19 for the base plate 7 itself is not shown in FIG. 2 so as to simplify matters.

For covering the slide-way groove 22, a cover 24 is arranged between the cover section 14 and the lower surface 8 of the base plate 7, said cover 24 resting on the top surface of the cover section 14 and being releasably secured e.g. to this cover section 14.

The cover 24 is provided with a slot 25 above the vehicle 20, said slot 25 extending in the direction of movement of the vehicle 20. A coupling means 23 extends through said slot 25 in the direction of the base plate 7.

In the embodiment shown, the coupling means 23 is defined by a lifting magnet which is adapted to be automatically raised and lowered in the directions 31. From the vehicle 20, this lifting magnet can be inserted into and removed from a cavity provided in the lower surface 8 of the base plate 7.

Reference is again made to the fact that, in the transport system according to the present invention, it is possible to guide the product carriers 6 vertically, as has been described e.g. in DE 298 16 285 of the same applicant. For adapting the transport system described in the present connection to such vertical guidance, the features described in the above-mentioned Utility Model can also be adopted for the present application.

What is claimed is:

1. A transport systems comprising:
   a slide way extending along a substantial portion of a production line;
   at least one product carrier adapted to be moved along said slide way by means of a linear drive unit;
   a primary part functioning as a stator of the linear motor;
   a secondary part functioning as a reaction member of the linear motor;
   wherein the product carrier is provided with a substantially flat base plate for transporting objects;
   wherein that the primary part is arranged on a vehicle and the slide way has associated therewith the secondary part, said vehicle being adapted to be coupled to the base plate so as to move in unison therewith;
   said vehicle moveable along said slide way independently of said base plate when not coupled to said base plate.

2. A transport system according to claim 1, wherein the linear motor drive unit is a synchronous motor.

3. A transport system according to claim 1 wherein the product carrier is adapted to carry a voltage supply unit.

4. A transport system according to claim 3 wherein the voltage supply unit is arranged in the base plate.

5. A transport system according to claim 3 wherein the slide way is formed by a pair of slide rails held in spaced relationship with one another by a plurality of support sections set up substantially vertically on a foundation.

6. A transport system according to claim 5 wherein a cover section is arranged between the support sections.

7. A transport system according to claim 6 wherein the secondary part is arranged on the cover section along the slide way.

8. A transport system according to claim 5 wherein the base plate is guided along the slide rails along its longitudinal edges.

9. A transport system according to claim 5 wherein the base plate has longitudinal edges and wherein said base plate is guided along the slide rails along its lower surface adjacent said longitudinal edges.

10. A transport system according to claim 1 wherein elements are arranged between said base plate and the slide way for guiding the base plate; said elements selected from the group consisting of roller elements, spherical elements, guide elements, and friction-reducing means.

11. A transport system according to claim 1 further including a position determination unit arranged between the product carrier and the slide way.

12. A transport system according to claim 1 wherein the product carrier is provided with onboard electronics which communicate with a central station so as to exchange data and/or instructions therewith.

13. A transport system according to claim 6 wherein bus lines are arranged on the product carrier so as to exchange data and/or instructions with the cover section.

14. A transport system according to claim 1 wherein the product carrier is provided with display means.

15. A transport system according to claim 1 wherein the product carrier is provided with interrogation means.

16. A transport system according to claim 1 wherein the product carrier is provided with input means.

17. A transport system according to claim 1 wherein the vehicle is adapted to be moved along a separate vehicle slide way extending below the base plate.

18. A transport system according to claim 17 wherein the slide way is formed by a pair of slide rails held in spaced relationship with one another by a plurality of support sections set up substantially vertically on a foundation; wherein a cover section is arranged between the support sections; and wherein the vehicle slide way is formed in the cover section.

19. A transport system according to claim 1 further comprising a voltage supply unit arranged in or on the vehicle.

20. A transport system according to claim 18, wherein the vehicle slide way is implemented in the cover section as a substantially U-shaped slide-way groove which is open at the top in the direction of the base plate.

21. A transport system including at least one Product carrier which is adapted to be moved along a slide way by means of a linear motor drive unit comprising:

a primary part;

a secondary part;

wherein the product carrier is provided with a substantially flat base plate for transporting objects;

wherein that the primary part is arranged on a vehicle and the slide way has associated therewith the secondary part, said vehicle being adapted to be coupled to the base plate;

wherein the vehicle is adapted to be moved along a separate vehicle slide way extending below the base plate;

wherein the slide way is formed by a Pair of slide rails held in spaced relationship with one another by a plurality of support sections set up substantially vertically on a foundation; wherein a cover section is arranged between the support sections; and wherein the vehicle slide way is formed in the cover section;

wherein the vehicle slide way is implemented in the cover section as a substantially U-shaped slide-way groove which is open at the top in the direction of the base plate; and a releasable coupling means arranged between the vehicle and the base plate.

22. A transport system according to claim 21 wherein the slide-way groove is adapted to be covered by a cover having formed therein a slot which extends in the direction of movement of the vehicle and which permits the coupling means to extend therethrough.

* * * * *